United States Patent [19]
Hunter et al.

[11] Patent Number: 5,090,446
[45] Date of Patent: Feb. 25, 1992

[54] ADJUSTABLE CHECK VALVE

[75] Inventors: Edwin J. Hunter, Rancho Santa Fe; Loren W. Scott, Carlsbad, both of Calif.

[73] Assignee: Edwin J. Hunter, Rancho Santa Fe, Calif.

[21] Appl. No.: 629,724

[22] Filed: Dec. 17, 1990

[51] Int. Cl.⁵ ............................................. F16K 15/02
[52] U.S. Cl. ........................................ 137/540; 251/337
[58] Field of Search ............... 137/540, 542, 543.17; 251/337

[56] References Cited

U.S. PATENT DOCUMENTS

| | | | |
|---|---|---|---|
| 3,422,840 | 1/1969 | Bryant et al. | 137/540 X |
| 4,049,017 | 9/1977 | Jones | 137/540 |
| 4,265,271 | 5/1981 | Rosaen et al. | 137/540 |
| 4,718,442 | 1/1988 | Nicoll | 137/540 X |

Primary Examiner—Martin P. Schwadron
Assistant Examiner—Kevin L. Lee
Attorney, Agent, or Firm—Baker, Maxham, Jester & Meador

[57] ABSTRACT

An adjustable pressure check valve comprises a generally cylindrical body having a throughbore communicating with an inlet and an outlet at opposite ends thereof, an annular valve seat in the throughbore, a valve member having a sealing surface for engagement with the seat disposed in the bore for movement into and out of engagement with the seat, a compression spring disposed in the throughbore for biasing the valve member into engagement with the seat, and an adjusting member for adjusting the biasing force of the spring on the valve member.

17 Claims, 1 Drawing Sheet

U.S. Patent    Feb. 25, 1992    5,090,446
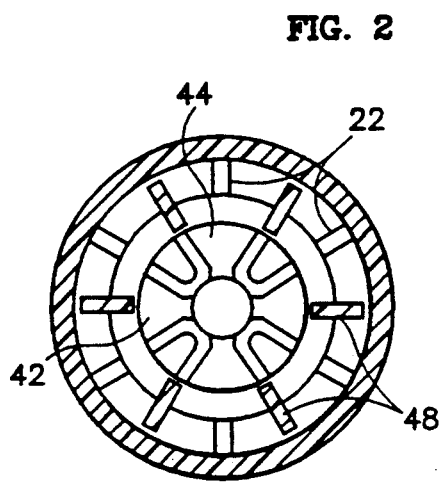
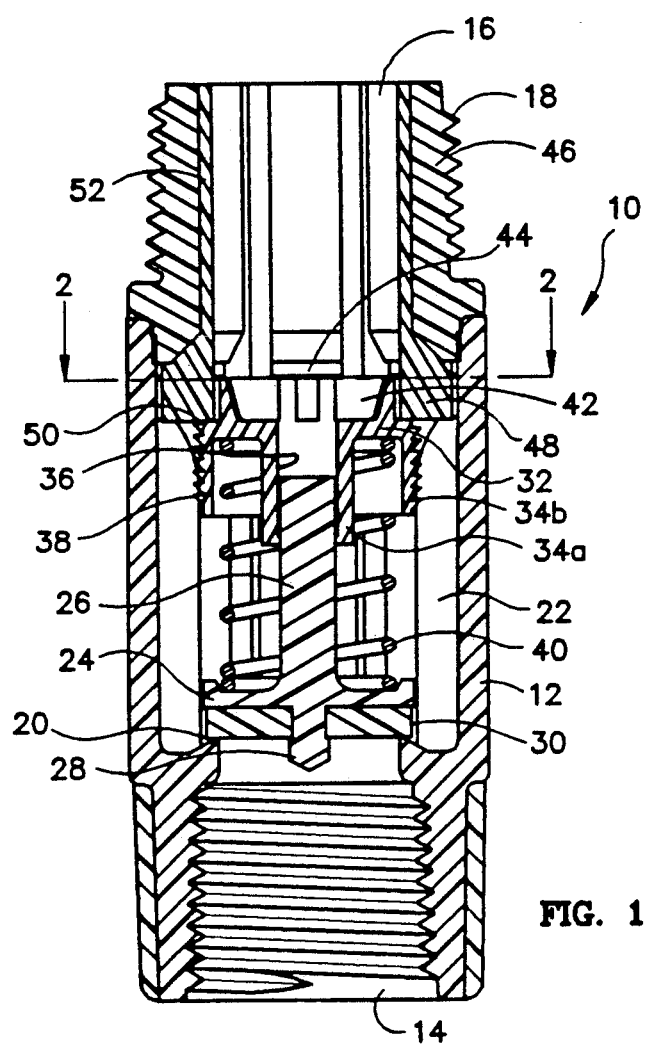
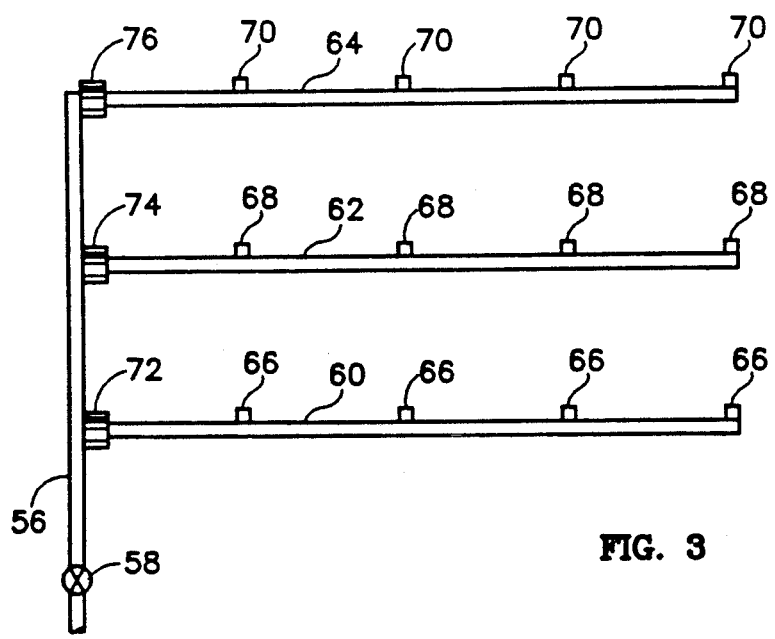

1

ADJUSTABLE CHECK VALVE

BACKGROUND OF THE INVENTION

The present invention relates to valves and pertains particularly to an improved adjustable pressure check valve.

Check valves are widely used to prevent back flow in a fluid system. This also prevents lines of the system from draining. They are also used to prevent flow until a certain minimum line pressure is achieved.

Some fluid systems may employ several check valves of different pressure settings. For example, some irrigation systems may have sprinkler units positioned at different elevations. This may require check valves for controlling pressure at the different elevations in order to obtain uniform flow rates at the different elevations.

It is preferable that check valves be adjustable in order to avoid the necessity of stocking many different valves. While adjustable check valves are known, they require removal from the system for access to both inlets and outlets thereof for adjustment.

It is desirable that a simple and easily adjustable check valve be available.

SUMMARY AND OBJECTS OF THE INVENTION

It is the primary object of the invention to provide an improved adjustable check valve.

In accordance with a primary of the present invention, a check valve includes adjustable means for adjusting the pressure thereof within predetermined limits.

BRIEF DESCRIPTION OF THE DRAWING

The above and other objects and advantages of the present invention will become apparent from the following description when read in conjunction with the accompanying drawings wherein:

FIG. 1 is a side elevation view in section of a preferred embodiment of the invention;

FIG. 2 is a section view taken generally on line 2—2 of FIG. 1; and

FIG. 3 is a front elevation view of an irrigation system embodying a check valve in accordance with the invention.

DETAILED DESCRIPTION OF A PREFERRED EMBODIMENT

Referring to the drawing, and particularly to FIGS. 1, and 2, there is illustrated an exemplary embodiment of the invention, designated by the numeral 10. The invention comprises an adjustable check valve wherein a pressure of the check valve may be adjusted from the end of the valve unit without the necessity of access the other end. It is oriented such that the access is the outlet of the valve so that it may be mounted on a riser or the like and may be adjusted while connected to a of water and under pressure.

The valve unit comprises a gene tubular body 12 having an inlet 14 with suitable or the like for attachment to a riser or the like, and an outlet port 16 having external threads in the illustrated embodiment for connection of distributing lines of the like The throughbore is formed near the inlet end with an annular valve seat 20 surrounding a passage into a normally larger diameter section of the housing, with a plurality of elongated inwardly extending ribs 22 extending substantially the length thereof.

A check valve member comprising an annular disc 24 on a forward end of an elongated stem 26 includes a retaining pin 28 on the forward end of the disc for retaining a washer seal 30 in place on the end of the stem backed by the disc 24. The washer or disc 30 is preferably formed of a suitable elastomeric material, such as a rubber or the like, and sealingly engages the annular valve seat 20 for closing and preventing flow through the valve A retaining nut 32 having an annular recess formed of inner and outer sleeves 34a, 34b, respectively, forms an annular recess for receiving one end of a coil spring 40, and has an inner bore 36 for receiving an upper end and portion of the valve stem 26. External threads 38 formed on the nut or retainer member 32 threadably engage the housing bore, specifically the inner edges of ribs 22 for screwing the nut downward or inward against the outer end of the spring, increasing the force of the coiled compression spring 40 against the valve disc 24 and the retaining nut. The nut 32 is located on the outlet side of the valve seat. It is preferably made of a harder material than that of the housing and ribs to be self-threading. The ribs provide a water flow passage around the nut. A water flow passage can also be provided through the nut by one or more apertures. This would eliminate the need for the ribs.

A pair of tool engaging cross slots 42 and 44 are formed in the upper end of the retaining nut 32 (FIG. 2) for receiving a tool, such as a screwdriver, for applying torque to the nut for rotating and driving it inward or outward of the housing against the bias of spring 40. The slots may accommodate a standard blade screwdriver or a Phillips screwdriver. The nut is accessible exclusively and solely from or at the outlet of the housing. Thus, the pressure of the valve may be adjusted by means of a single tool (screwdriver) at the outlet while the valve is in place.

The housing is made up of two axially disposed, generally tubular pieces or sections forming a generally tubular housing secured together by solvent or sonic welding to form a unitary housing. The outlet section 46 of the housing includes axially or forwardly extending rib members 48 extending axially and inwardly for engaging an annular shoulder 50 on the retaining nut for limiting the outward movement thereof. The ribs, together with inwardly extending rib extensions 52 within the bore of 46, insure a flow passage around the retaining nut, and the outer end of the retaining nut is in its outward or retracted position.

The combination of the retaining nut and the valve stem 26 limit the inward movement of the retaining nut toward the valve seat, and thus the maximum pressure adjustment of the valve by action of the nut in relation to the valve stem. As the nut moves inward, the valve stem projects into and along the center of the nut and upward through the center of the bore into the area of the tool slots 42 and 44, displacing a tool from the tool slots. As the tool is displaced, it can no longer apply a torque to the nut, and thus limits the inward movement of the nut. This limits the compression of the coil spring 40.

The outward movement of the nu is limited by the engagement of annular shoulder 50 thereon, with the shoulder formed by the forward or axial extension of the rib members 48. Thus, the minimum and maximum pressure of the valve may be limited in this manner by the range of movement of the retaining nut.

In operation, the valve 10 may be assembled and preset to predetermined pressures by adjustment of the nut inward and/or outward prior to its installation. It may also be adjusted in the system to achieve a desired pressure and/or flow. Referring to FIG. 3, an example of use of valves in accordance with the invention is schematically illustrated in the form of a sprinkler system having a main supply line 56, with a control or shut off valve 58 supplying water to branch lines 60, 62 and 64, all of a different level with a branch 60 being a lower level or elevation and 62 and 64 at yet higher elevations.

Check valves 72, 74 and 76 are placed at the juncture of each of the branch lines, with the main supply line for each of the branch lines. With the branch lines at different elevations, in order to achieve uniform irrigation coverage by the sprinkler system, the check valves 72, 74 and 76 must be set different pressure settings. The valves must be set to at the same time to permit the same flow rate to each the branch lines. The valve 72 will be at higher pressure than valve 74, which will also be at a higher pressure than valve 76. The pressure settings will be an amount to compensate for the head due to the different elevations. Thus, compensation can be made for different elevations within an irrigation system, and enable one to achieve the same sprinkler overage at different elevations within the same system.

While we have illustrated and described our invention by means of specific embodiments, it should be understood that numerous changes and modifications, may be made therein without departing from the spirit and scope of the invention as defined in the appended claims. The further assert and sincerely believe that the above specification contains a written description of the invention and the manner and process of making and using it, in such full, clear, concise, and exact terms as to enable any person skilled in the art to which it pertains, or with which it is most nearly concerned, to make and with which it further that it sets forth the best mode contemplated by us for carrying out the invention.

We claim:

1. An adjustable pressure check valve comprising:
    a generally cylindrical body having a throughbore communicating with an inlet and an outlet at opposite ends thereof, said throughbore having inwardly and longitudinally extending ribs;
    an annular valve seat in said throughbore;
    a valve member having a sealing surface for engagement with said seat disposed in said bore for movement into and out of engagement with said seat;
    compression spring means disposed in said throughbore for biasing said valve member into engagement with said seat; and
    adjusting means accessible exclusively via said outlet for adjusting the biasing force of said spring on said valve member, said adjusting means comprises a threaded member having external threads threadably engaging said ribs in said through bore and having an annular shoulder engaging said spring.

2. An adjustable pressure check valve according to claim 1 wherein:
    said spring means comprises an elongated coil spring having one end engaging said valve member and an other end engaging said adjusting means; and
    said threaded member having an annular shoulder engaging said other end of said spring.

3. An adjustable pressure check valve according to claim 1 wherein:
    said valve member comprises a circular disc having an elongated coaxial stem extending from one side thereof, and a retaining pin extending from the other end and
    a sealing washer on said retaining pin for engaging said valve seat.

4. An adjustable pressure check valve according to claim 1 wherein:
    said throughbore is coaxial of said body;
    said annular valve seat is coaxial of said throughbore; and
    said valve member is disposed coaxially of said throughbore.

5. An adjustable pressure check valve according to claim 1 wherein:
    said threaded member having an annular shoulder engaging said spring.

6. An adjustable pressure check valve according to claim 1 wherein:
    said threaded member has a coaxial throughbore, and said valve having a stem which is reciprocally mounted in said throughbore.

7. An adjustable pressure check valve comprising:
    a generally cylindrical body having a throughbore communicating with an inlet and an outlet at opposite ends thereof, said throughbore having inwardly and longitudinally extending ribs;
    an annular valve seat in said throughbore;
    a valve member having a sealing surface for engagement with said seat disposed in said bore for movement into and out of engagement with said seat;
    compression spring means disposed in said throughbore for biasing said valve member into engagement with said seat; and adjusting means accessible exclusively via said outlet for adjusting the biasing force of said spring on said valve member, said adjusting means comprises a threaded member having external threads threadably engaging said ribs in said throughbore and having an annular shoulder engaging said spring;
    said thread member has a tool fitting for receiving a torque applying tool at said outlet, and a valve member including a stem positioned to displace a tool therefrom for limiting the adjustment thereof in one direction, and said body includes shoulder means for limiting adjustment thereof in the other direction for limiting the adjustment of the pressure of said valve.

8. An adjustable pressure check valve according to claim 7 wherein:
    said tool fitting is a cross slot for receiving a screwdriver.

9. An adjustable pressure check valve comprising:
    a generally cylindrical body having a coaxial throughbore communicating with an inlet and an outlet at opposite ends thereof, said throughbore having inwardly and longitudinally extending ribs;
    an annular valve seat coaxial of said throughbore adjacent said inlet end;
    a valve member comprising a circular disc having an elongated coaxial stem extending from one side, thereof, a retaining pin extending from the other end, and a sealing washer on said retaining pin having a sealing surface for engagement with said seat disposed in said bore for movement into and out of engagement with said seat;

an elongated coiled compression spring disposed in said throughbore in compressive engagement with said valve member for biasing said valve member into engagement with said seat; and adjusting means threadably engaging said body on the outlet side of said valve seat for adjusting the biasing force of said spring on said valve member, said adjusting means comprises a threaded member having external threads threadably engaging said ribs in said throughbore and having an annular shoulder engaging said spring.

10. An adjustable pressure check valve according to claim 9 wherein:

said threaded member having an annular shoulder engaging said spring.

11. An adjustable pressure check valve according to claim 10 wherein:

said threaded member has a coaxial throughbore, and said valve stem is reciprocally mounted in said throughbore.

12. An adjustable pressure check valve according to claim 11 wherein:

said threaded member has a tool fitting for receiving a torque applying tool at said outlet, and said stem is positioned to displace a tool therefrom for limiting the adjustment thereof in one direction, and said body includes shoulder means for limiting adjustment thereof in the other direction for limiting the adjustment of the pressure of said valve.

13. An adjustable pressure check valve according to claim 12 wherein:

said tool fitting is a cross slot for receiving a screwdriver.

14. An adjustable pressure check valve comprising:

a generally cylindrical body having a coaxial throughbore communicating with an inlet and an outlet at opposite ends thereof, said throughbore having inwardly and longitudinally extending ribs;

an annular valve seat coaxial of said throughbore adjacent said inlet;

a valve member comprising a circular disk having an elongated coaxial stem extending from one side thereof, a retaining pin extending from the other end, and a sealing washing on said retaining pin having a sealing surface for engagement with said seat disposed in said bore for movement into and out of engagement with said seat;

an elongated coiled compression spring disposed in said throughbore in compressive engagement with said valve member for biasing said valve member into engagement with said seat; and adjusting means accessible at said outlet for adjusting the biasing force of said spring on said valve member, said adjusting means comprises a threaded member having external threads threadably engaging said ribs in said throughbore and having an annular shoulder engaging said spring.

15. An adjustable pressure check valve according to claim 12 wherein:

said threaded member has a coaxial throughbore, and said valve stem is reciprocally mounted in said throughbore.

16. An adjustable pressure check valve according to claim 15 wherein:

said threaded member has a tool fitting for receiving a torque applying tool at said outlet, and said stem is positioned to displace a tool therefrom for limiting the adjustment thereof in one direction and said body includes shoulder means for limiting adjustment thereof in the other direction for limiting the adjustment of the pressure of said valve.

17. An adjustable pressure check valve according to claim 14 wherein:

said tool fitting is a cross slot for receiving a screwdriver.

* * * * *